United States Patent [19]

Sawyer et al.

[11] Patent Number: 4,662,272
[45] Date of Patent: May 5, 1987

[54] BARBECUE APPARATUS

[76] Inventors: Anthony P. Sawyer; Graham W. Sawyer, both of 15 Leopold Street, Strand, Cape Province, South Africa

[21] Appl. No.: 829,043

[22] Filed: Feb. 13, 1986

[30] Foreign Application Priority Data

Feb. 13, 1985 [ZA] South Africa ............... 85/1070

[51] Int. Cl.⁴ ............................................. A47J 37/04
[52] U.S. Cl. .......................................... 99/334; 60/531; 99/397; 99/421 M; 99/427
[58] Field of Search .................... 99/421 M, 325, 334, 99/397, 421 R, 427; 426/523; 60/531; 126/41 B

[56] References Cited

U.S. PATENT DOCUMENTS

| | | | |
|---|---|---|---|
| 2,391,571 | 12/1945 | Hennessy | 60/531 X |
| 3,070,953 | 1/1963 | Carrel | 99/421 M X |
| 3,184,914 | 5/1965 | Cole | 99/421 M X |
| 3,321,982 | 5/1967 | Maunus | 99/421 M |
| 3,322,061 | 5/1967 | Frazier | 99/421 M |
| 3,511,167 | 5/1970 | Holtkamp | 99/421 R X |
| 3,782,122 | 1/1974 | Lorenz | 60/531 |
| 4,104,959 | 8/1978 | Demerson | 99/421 M X |
| 4,114,523 | 9/1978 | Eff | 99/427 X |

Primary Examiner—Billy J. Wilhite
Attorney, Agent, or Firm—Millen & White

[57] ABSTRACT

A barbecue apparatus for roasting food such as meat, vegetables or the like over a bed of coals, is disclosed. The apparatus is adapted to automatically turn the food from time to time, by converting heat energy transferred from the bed of coals to an expansion member or from the expansion member to the atmosphere, to potential energy which is temporarily stored in a spring and released therefrom upon operation of a trigger mechanism, to alternately turn the food from a first position to a second position and vice versa.

9 Claims, 13 Drawing Figures

BARBECUE APPARATUS

FIELD OF THE INVENTION

This invention relates to cooking apparatus. More particularly, the invention relates to a barbecue apparatus suitable for use in cooking meat, vegetables and/or other food over a bed of glowing coals or embers, the apparatus being adapted to automatically alternate between a first position in which one side of the food is exposed to the bed, and a second position in which another side of the food is exposed to the bed.

BACKGROUND OF THE INVENTION

Various types of barbecue cooking apparatus are known to the applicant. Thus, for instance, apparatus are in existence which comprise grills adapted to contain the meat or other food and which are adapted to be suspended or held above a bed of glowing coals or embers, and to be manually turned so as to alternately expose each of two sides of the food to heat emanating from the bed of coals or embers.

In other types of apparatus, a spit is passed through a piece of meat or other food, and is then suspended between two bearings or supports and rotated continuously be means of an electric motor driving the spit.

Whilst the former type of apparatus presents the problem of it requiring continuous attention from the user, the latter type of apparatus has the disadvantage that the food is continually rotated independently of the temperature of or heat flux from the bed of coals or embers.

There accordingly exists a need for an apparatus which is adapted to utilise heat emanating from the bed or coals or embers and to automatically turn the food from time to time, the duration of its turning cycle to be dependent on the temperature of and/or heat flux from the bed.

OBJECTS AND SUMMARY OF THE INVENTION

It is an object of the invention to provide a barbecue apparatus which is adapted to automatically roast meat, vegetables and/or other food, the apparatus being adapted to be operated by means of heat liberated by the bed of coals or embers.

It is a further object of the present invention to provide a barbecue apparatus suitable for the roasting of food over a bed of glowing coals or embers, the apparatus being adapted to automatically turn the food from a first position in which a first side of the food is exposed to the bed, to a second position in which a second side of the food is exposed to the bed, the apparatus being adapted to vary its turning cycle according to the temperature of or heat flux from the bed of coals or embers.

According to the invention, there is provided a barbecue apparatus comprising:

food retaining means adapted to hold a piece of meat;
support means for supporting the food retaining means above a bed of coals; and
food turning means including an expansion member adapted to expand when it is heated by heat radiated from the bed of coals and to contract when it is cooled down, the food turning means being adapted, upon expansion of the expansion member, to turn the food retaining means from a first position in which one side of the meat is exposed to heat transferred from the bed of coals, to a second position in which another side of the food is exposed to heat transferred thereto from the bed of coals.

Preferably, the food turning means is also adapted, upon contraction of the expansion member, to turn the food retaining means from the second position to the first position.

In a preferred embodiment of the invention, the food retaining means is a substantially rectangular, each corner thereof being provided with a flanged wheel, the wheels of each short side of the food retaining means being locatable on a track adapted to turn the food retaining means from the first position to the second position when an appropriate torque is applied thereto.

Each track may conveniently comprise a three-membered ring of which each member is convexly curved along an arc of a circle having a radius slightly exceeding the distance between the outer surfaces of the wheels of each short side, the member being attached to one another in an end to end relationship.

The food turning means may also comprise energy storing means and a trigger mechanism, the energy storing means being adapted to store potential energy derived from respectively, the expansion or contraction of the expansion member, and to release the said potential energy upon actuation of the trigger mechanism to turn the food turning means from respectively, the first position to the second position or from the second position to the first position.

The trigger mechanism is preferably operated by the expansion member upon having stored sufficient energy in the energy storing means to turn the food turning means respectively from the first to the second position or from the second to the first position.

The expansion member may comprise a spring, and the pressure inside the expansion member may be above atmospheric pressure when it is at ambient temperature. Alternatively, the pressure inside the expansion member may be below atmospheric pressure when it is at ambient temperature.

In a further preferred embodiment of the invention, the expansion and contraction of the expansion member are assisted by water inside the expansion member respectively evaporating or condensing as the expansion member is heated or cooled. To facilitate heat transfer from the bed of coals to the expansion member during a heating portion of its turning cycle, and from the expansion member to the atmosphere during a cooling portion of its turning cycle, the expansion member may be provided with heat transfer acceleration means such as fins, a blackened surface or the like.

BRIEF DESCRIPTION OF THE DRAWINGS

The invention will now be described, by way of example, with reference to the accompanying drawings, in which.

DETAILED DESCRIPTION OF THE DRAWINGS

Figure 1:
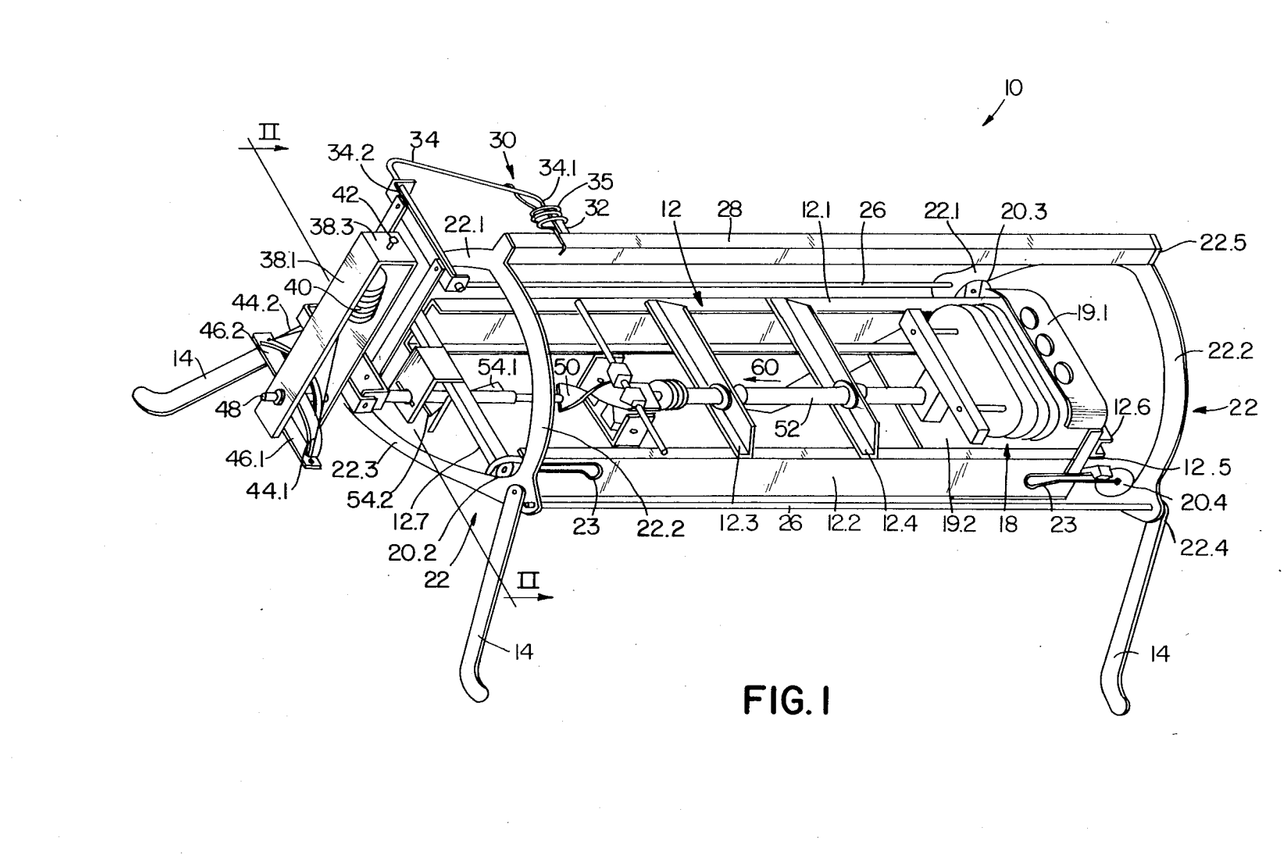
FIG. 1 shows a perspective view of a barbecue apparatus in accordance with the invention.

Referring to FIG. 1, reference numeral 10 generally indicates a barbecue apparatus in accordance with the invention.

The apparatus 10 comprises:
- a food retaining means 12 adapted to hold one or more pieces of food (not shown);
- support means including legs 14 for supporting the food retaining means 12 above a bed of coals or embers (also not shown) and;
- food turning means 16 including an expansion member 18 adapted to expand when it is heated by heat radiated from the bed of coals.

The bed of coals may be provided in a tray or on a grill which may either be placed on the ground or preferably is spaced therefrom by providing the tray or grill with legs. The tray is preferably rectangular and of a size which is roughly the same as that of the food retaining means 12.

The food retaining means 12 comprises a pair of channel-shaped members 12.1, 12.2, of which the channels face each other. The members 12.1, 12.2 are held parallel to and spaced from each other by means of cross brackets 12.3, 12.4 of which the ends are welded to the channel members 12.1, 12.2.

A double-layered grill (not shown) which may be adapted to be passed into the space between the channel members 12.1, 12.2 may be provided with the apparatus. The two layers of the grill may be hingedly attached to each other along one of their long sides and the other long side may be adapted to be opened and closed for inserting and removing the food into or from the grill.

The expansion member 18 is mounted to adjacent ends of the members 12.1, 12.2, by means of brackets 12.5, 12.6.

The other ends of the members 12.1, 12.2 are interconnected by means of a square tube 12.7 accommodating part of a trigger mechanism 18. In this way, a rectangle is formed having short sides represented by the tube 12.7 and the bracket 12.6, and long sides represented by the members 12.1, 12.2.

Figure 2:
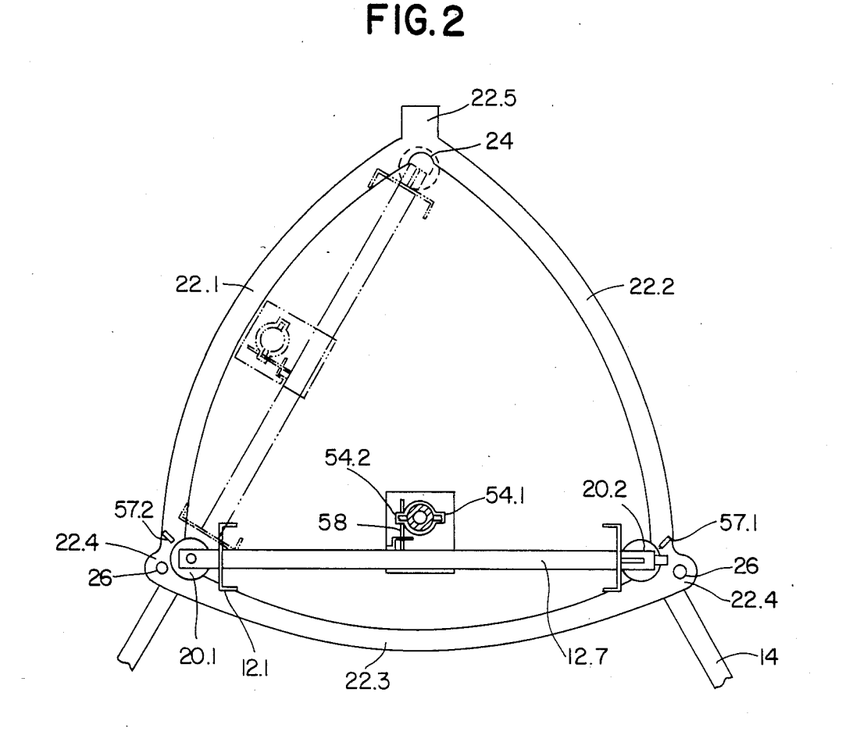
FIG. 2 shows a section II—II through the apparatus of FIG. 1.

The food retaining means 12 is provided with flanged wheels 20.1, 20.2, 20.3, 20.4 on each of the corners of the rectangle. The wheels 20.1, 20.2; 20.3, 20.4 of each short side of the rectangle are located on the inside surface of two corresponding three-membered rings 22 made of a flat material located in a plane parallel to the short sides of the rectangle, and which is perpendicular to the plane of the rectangle. The wheels 20 are mounted to the sides of the channel members 12.1, 12.2 by means of hair-pin shaped suspension springs 23 adapted to overcome irregularities on the inner surfaces of the rings 22.

Each member 22.1, 22.2, 22.3 of the three-membered rings 22 is convexly curved along an arc of a circle having a radius slightly exceeding the distance between the outer surfaces of the wheels of each short side of the rectangle. The members of each three-membered ring 22 are integrally connected to one another in an end to end relationship. A notch 24 having a radius of approximately the same as that of the flanged wheels 20 is provided in each corner formed between adjoining members of the rings 22.

The rings 22 are interconnected by means of side rods 26 of which the ends protrude through holes provided through extensions of the three-membered rings 22, in the form of flanges 22.4. One end of each leg 14 is pivotally attached to a corresponding flange 22.4 and the ends of the rods 26 act as stops limiting the outward pivotal movement of the legs 14 in a position in which the legs can support the apparatus 10 when it is in use. The legs 14 may also be pivoted to an inoperative position in which they are located adjacent the rings 22.

At the apex of the members 22.1, 22.2 of each ring 22, a further extension 22.5 is provided, and the ends of a main beam 28 are attached to the extensions 22.5 to rigidly interconnect the rings 22. The main beam 28 is made of square tubing.

A suspension mechanism 30 is provided to counteract the weight of the food retaining means 12, the grill and the food during use of the apparatus. The mechanism 30 comprises a top stay 32 which is attached to the main beam 28 adjacent one of the rings 22. The mechanism 30 further comprises a swivel arm 34 having a spindle portion 34.1 rotatably mounted to the top stay 32, and an horizontal portion 34.2. The horizontal portion 34.2 may be swivelled from a position above the apparatus 10 to a position in front of the apparatus 10 (referring to FIG. 1).

The mechanism 30 also comprises a counterspring 35 adapted to urge the horizontal portion 34.2 of the swivel arm 34 to the position above the apparatus 10.

Figure 4:
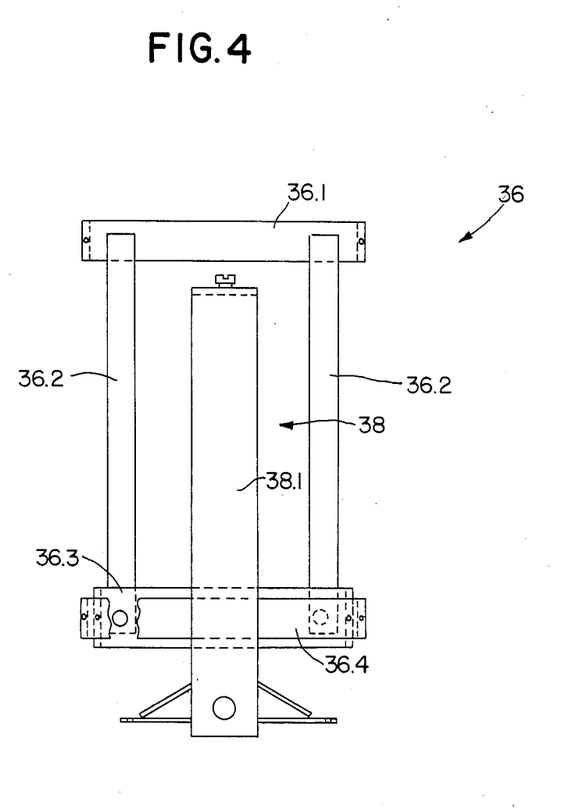
FIG. 4 shows an end elevation of a transfer mechanism forming part of a spring-loaded suspension mechanism forming part of the apparatus.

The horizontal portion 34.2 carries a transfer mechanism 36 (see also FIG. 4). The mechanism 36 comprises a top bracket 36.1 made of a flat strip of metal of which the ends are bent through 90 degrees and provided with holes adapted to receive the horizontal portion 34.2 of the arm 34. One end of each of two struts 36.2 is pivotally attached to the bracket 36.1 intermediate its ends. The other ends of the struts 36.2 are pivotally mounted to a bottom bracket 36.3 which has the same general shape as the top bracket 36.1, but the ends of which are bent through 90 degrees in a direction away from the apparatus 10.

Figure 3:
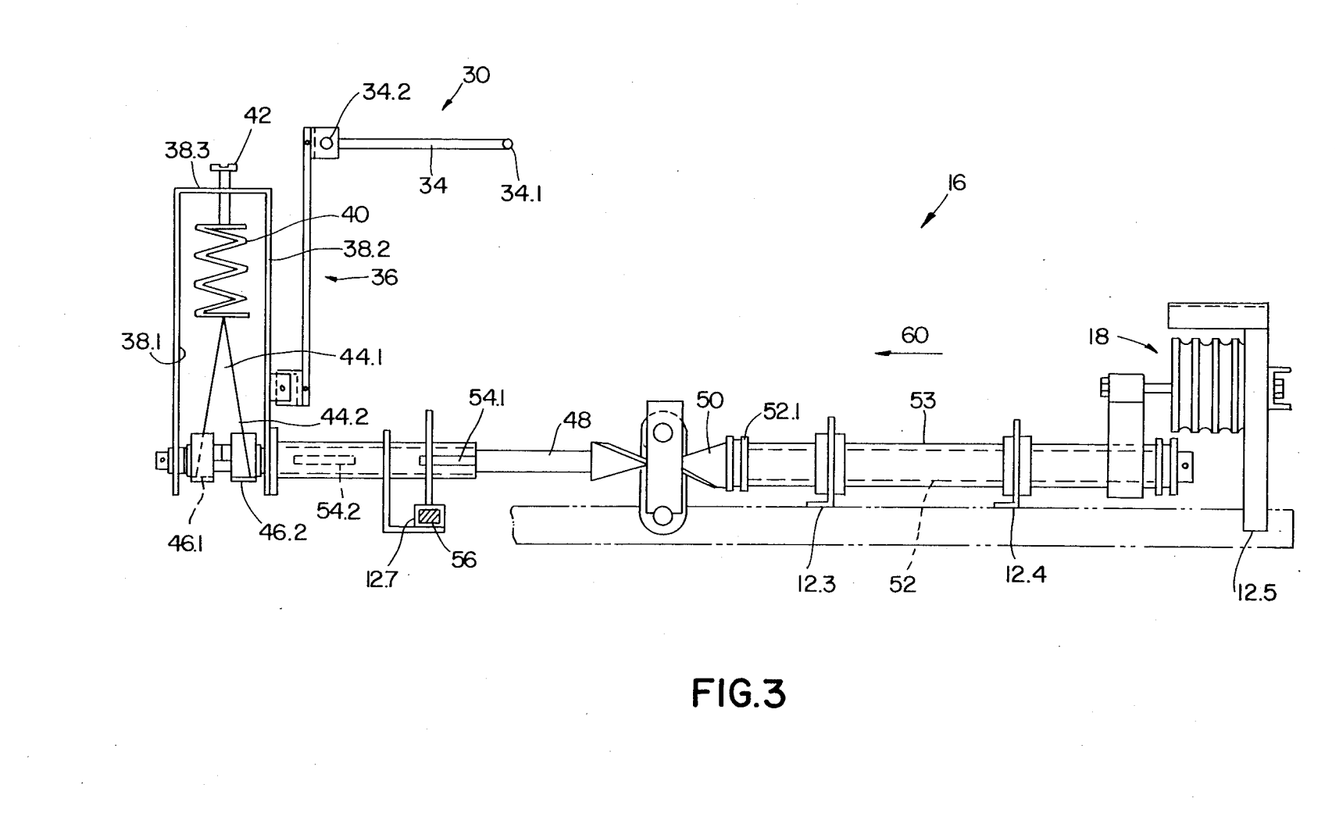
FIG. 3 shows an elevational view of food turning means forming part of the apparatus.

A further bracket 36.4 is attached to the ends of the bracket 36.3. To the further bracket 36.4, a spring housing 38 is rigidly attached. The spring housing 38 has two substantially parallel, vertical legs 38.1, 38.2 interconnected by a top member 38.3. The spring housing 38 houses energy storing means in the form of a spring 40, one end of which is attached to the top member 38.3. The tension of the spring 40 is adjustable through an adjusting screw 42 provided in the top member 38.3. The other end of the spring 40 is attached, by means of flexible metallic strings 44.1, 44.2 to the free end of each of a pair of cams 46.1, 46.2 (see also FIGS. 5 and 6). The cams 46.1, 46.2 are mounted between the legs 38.1, 38.2 on a torque rod 48 of which one end extends through the legs 38.1, 38.2 of the spring housing 38. The other end of the torque rod 48 is attached to one end of a helical plate 50, the other end of which is connected to one end of a push rod 52 which fits loosely inside a push rod tube 53. One end of the tube 53 is rotatably mounted on the rod 52 via a bearing 52.1, whilst the other end of the tube 53 is connected to the expansion member 18.

Figure 5:
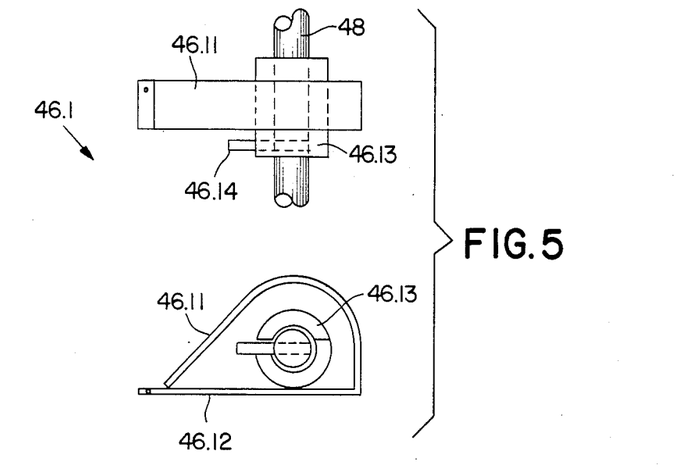
FIGS. 5 and 6 show details of cams forming part of the food turning means.
Figure 6:
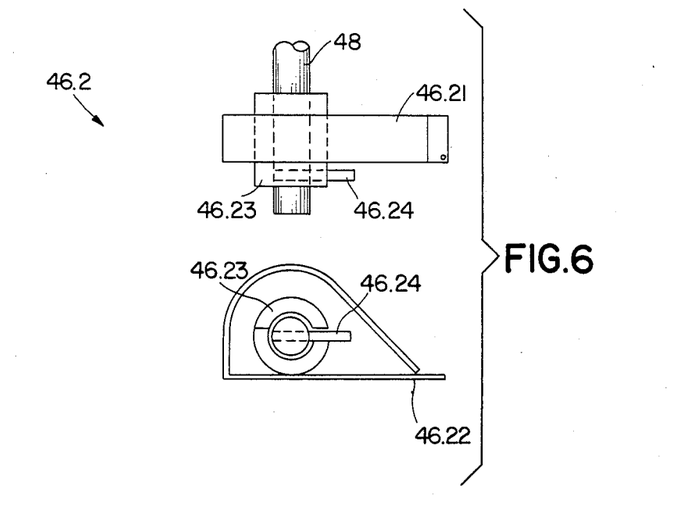

The cams 46.1, 46.2 are each provided with a curved portion 46.11, 46.21 for receiving the strings 44.1, 44.2; and a straight portion 46.12, 46.22. The free ends of the straight portions 46.12, 46.22 are each provided with an eye through which the strings 44.1, 44.2 may be attached to the cams 46.1, 46.2 respectively. Each cam 46.1, 46,2 is provided with a bush 46.13, 46,23 which fits loosely on the torque rod 48. One end of each of the bushes 46.13, 46.23 has been cut away through 180 degrees, and a pin 46.14, 46.24 is passed through a corresponding hole extending transversely through the rod 48, in such a way as to allow each of the cams 46.1, 46.2 to freely rotate about the torque rod 48, through an angle of 180 degrees.

The torque rod 48 is provided with two transversely extending wedge members 54.1, 54.2 respectively located on opposite sides of the torque rod 48. The wedge members 54.1, 54.2 are longitudinally spaced from each other along the rod 48 and slope inwardly towards each other.

Figure 7:
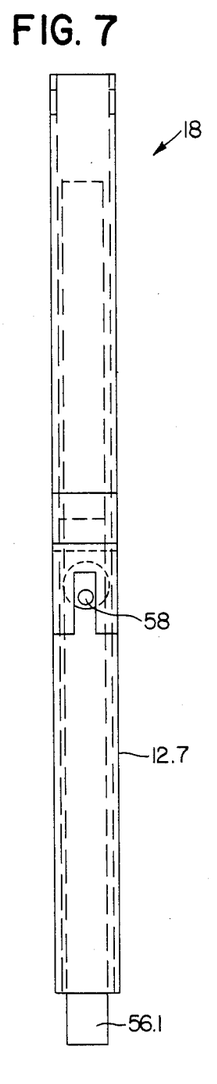
FIG. 7 shows a bottom plan view of a trigger mechanism forming part of the food turning means.
Figure 8:
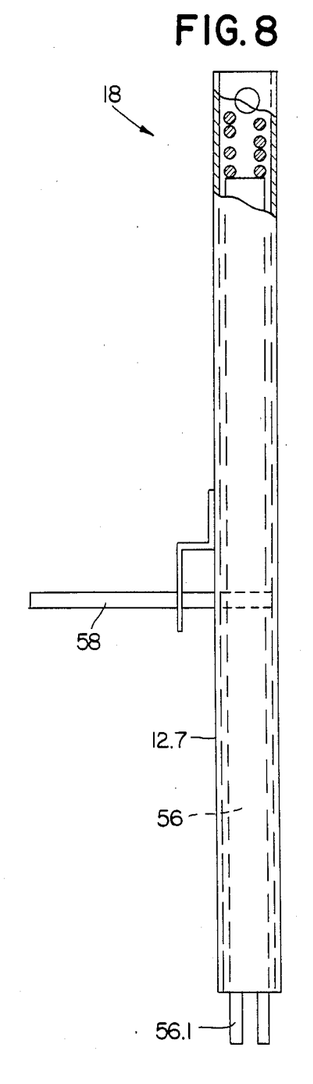
FIG. 8 shows a side view of the trigger mechanism of FIG. 7.

The square tube 12.7 houses a spring-loaded trigger rod 56 of square cross-section (see also FIG. 7 and 8). One end of a transversely extending trigger pin 58 is attached to the rod 56, the other end projecting downwardly to between the wedge members 54.1, 54.2. One end 56.1 of the rod 56 is forked and is adapted to engage with either one of two stays 57.1, 57.2 mounted on the flanges 22.4 of the front three-membered ring 22 (see FIG. 2). The stays 57.1, 57.2 are provided on the two opposite flanges 22.4 of the front ring 22, in order to ensure that the food retaining means is held in either a first position in which one side of the food is exposed to the bed of coals, or a second position in which the other side of the food is exposed to the bed of coals.

When the expansion member 18 expands, the push rod tube 53, push rod 52, the helical plate 50 and the torque rod 48 are pushed in the direction of the arrow 60, until one of the wedge members 54.1, 54.2 engages with the trigger pin 58 and causes it to be pushed laterally. This movement causes the trigger rod 56 to be pushed inside the tube 12.7, causing the forked end 56.1 of the rod 56 to disengage from the respective stay 57.1, 57.2.

Figure 9:
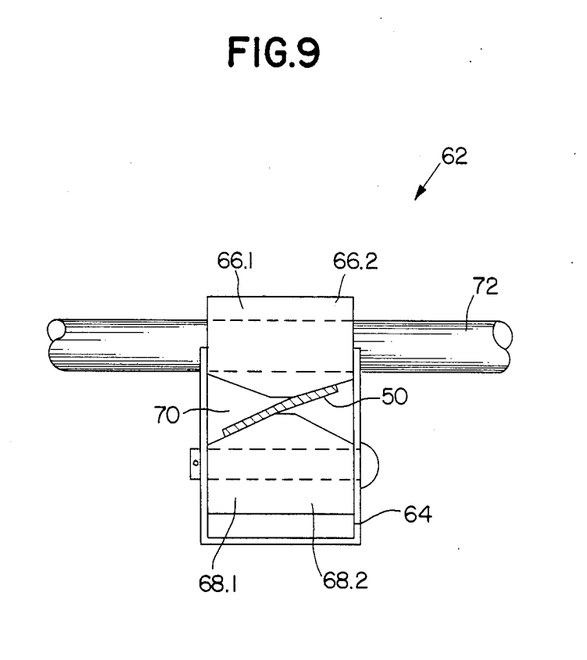
FIG. 9 shows details of torque generator means forming part of the food turning means.

As is shown in FIG. 9, the helical plate 50 passes through a torque generator means 62. The means 62 comprises a substantially U-shaped mounting plate 64 accommodating a pair of top guide members 66.1, 66.2 and a pair of bottom guide members 68.1, 68.2. The guide members 66, 68 are shaped as is shown in FIG. 9, providing a gap 70 between the top guide members 66 and the bottom guide members 68. The gap 70 allows a free movement of the helical plate 50 through approximately 30 degrees. The means 62 is mounted to the guide members 12.1, 12.2 via a pin 72 of which the ends are welded to the members 12.1, 12.2.

Figure 10:
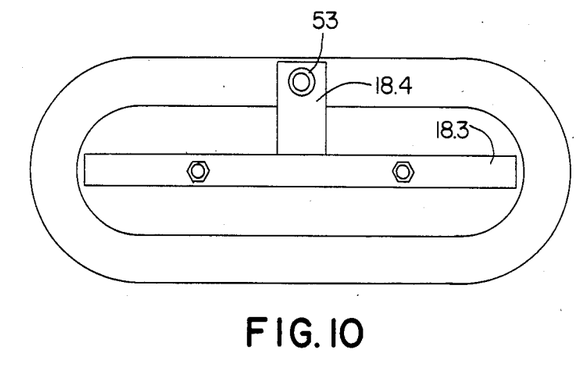
FIG. 10 is an end on view of an expansion member.
Figure 11:
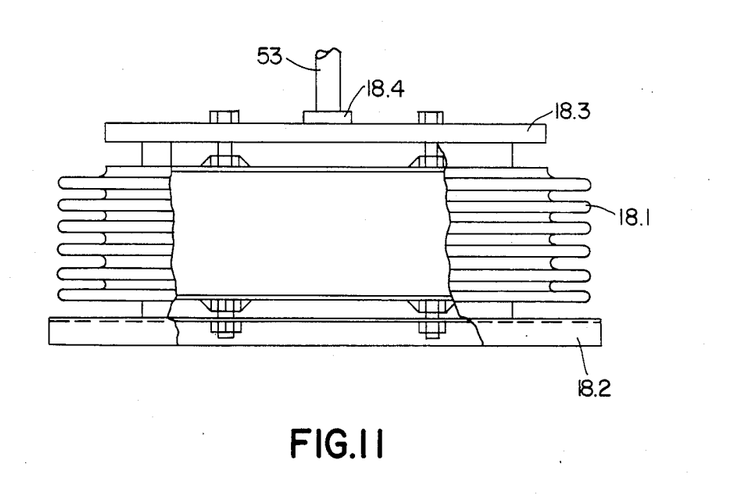
FIGS. 11 to 13 show part-sectional views of alternative embodiments of expansion members.

As can be seen in FIGS. 10 and 11, the expansion member 18 comprises a bellows 18.1 which is capable of being expanded or contracted, depending upon the pressure inside the expansion member 18. One end of the bellows 18.1 is mounted on a base plate 18.2, whilst the other end of the bellows 18.1 is provided with a cross bar 18.3 which is connected via a push rod adaptor 18.4 to the push rod tube 53. The space inside the bellows 18.1 is filled with a medium which is capable of expanding or contracting the bellows 18.1 upon heating or cooling thereof by heat radiated from the bed of coals to the expansion member 18, or transferred therefrom to the atmosphere during cooling thereof. It has been found that by placing a small amount of water inside the bellows 18.1, a satisfactory expansion and contraction of the bellows 18.1 can be obtained under normal operating conditions. Alternatively, any other appropriate liquid or gas may be used.

Figure 12:
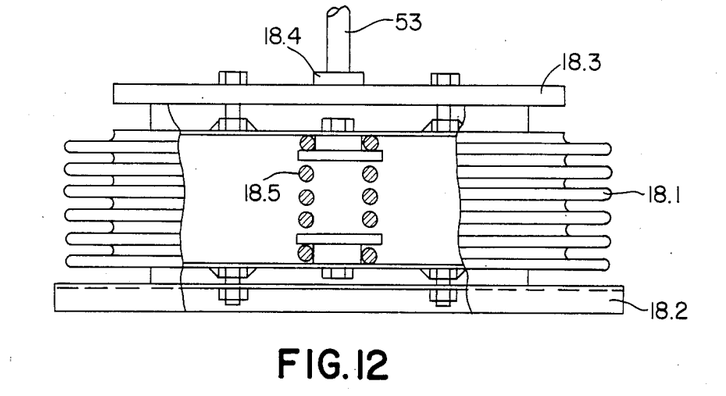
Figure 13:
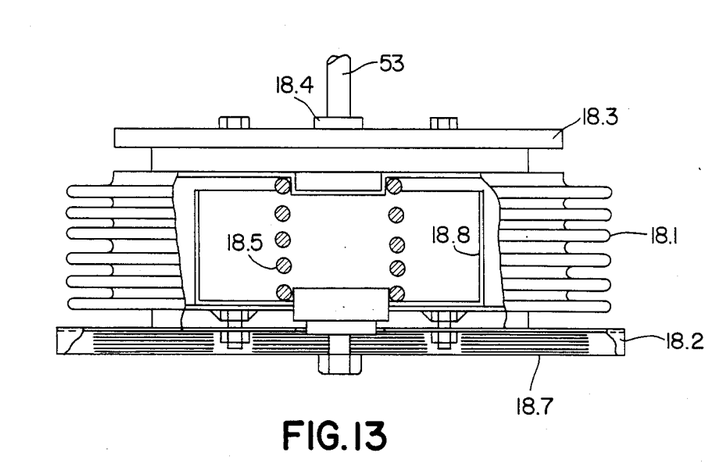

In FIGS. 12 and 13, alternative embodiments of expansion members 18 are shown. In the embodiment shown in FIG. 12, the expansion member 18 comprises a tension spring 18.5 which is normally kept under tension, with the space inside the bellows 18.1 being under pressure. When the ballast member 18.1 is heated by the bed of coals, the pressure of the medium inside it increases, causing the expansion member 18 to expand.

In the embodiment of the expansion member 18 shown in FIG. 13, the space inside the expansion member 18.1 is normally kept under vacuum, with the spring 18.5 under compression. Heat transfer acceleration means in the form of cooling fins 18.7 are provided on the base plate 18.2, so as to facilitate cooling of the expansion member 18 in its top position. To further increase the rate of heat transfer to the fins 18.7, a copper dish 18.8 is provided inside the ballast 18.1, the dish 18.8 being mounted to the base plate 18.2. It has been found that by the use of the cooling fins 18.7, the duration of the cooling portion of the cycle can be decreased under a given set of circumstances from about 8 minutes to about 2.5 minutes. The turning cycle could also be decreased or increased by blackening or brightening the outside surface of the ballast 18.1.

In use, food such as meat, vegetables or the like, is placed inside the grill and the grill is inserted into the space between the channel members 12.1, 12.2. The legs 14 of the apparatus 10 are pivoted to their operative position in which they support the apparatus 10 and the apparatus 10 is then placed on the ground. A tray of glowing coals or embers is provided underneath the grill, in a position in which the food will be roasted and in which heat will be transferred to the expansion member 18, for instance by means of radiation through holes in a perforated plate 19.1 mounted to the brackets 12.5 beside the expansion member 18.

With the apparatus in a first position in which the ballast faces the tray of coals, the expansion member 18 is gradually heated up causing the water provided on its inside to evaporate and expand. This expansion causes the tube 53 and hence the push rod 52 to be pushed in the direction of the arrow 60, with the result that the helical plate 50 causes the torque rod 48 and the push rod 52 to be rotated through 180 degrees. This rotation movement causes the cam 46.1 to tension the spring 40, thereby storing at least part of the energy generated by the expansion of the expansion member 18. The movement of the push rod 52 proceeds until eventually the wedge member 54.1, which is then facing the trigger pin 58, causes the trigger rod 56 to be pushed along the tube 12.7 until the forked end 56.1 of the rod 56 disengages with the stay 57.1 on the ring 22. The energy stored in the spring 40 then causes the food retaining means 12 to be rotated as follows:

First, the wheels 20.1, 20.3 are kept stationary while the wheels 20.1, 20.4 move along the members 22.2. When the apexes of the rings 22 are reached (see FIG. 2), the wheels 20.2, 20.4 are kept stationary whilst the wheels 20.1, 20.2 move along the members 22.3 until the food retaining means 12 has been turned through 180 degrees. In this position, the expansion member 18 is screened from the coals by means of a plate 19.2 (see FIG. 1), which is mounted to the bracket 12.5 so as to screen the expansion member 18 from the bed of coals. The result is that the expansion member 18 starts cooling down. This causes it to contract, pulling the tube 53, the push rod 52 and the torque rod 48 back to their original positions. When the wedge member 54.2 engages with the trigger pin 58, the trigger rod 56 is caused to disengage from the stay 57.2 and the potential energy stored in the spring 40 as a result of the contraction of the expansion member 18 is then released via the cam 46.2 causing the food retaining means 12 to again be rotated through 180 degrees to its original position, in the same way as in the first half of its cycle.

In this way the expansion member 18 is alternately heated and cooled to cause the food retaining means to be rotated from a first position in which the expansion member 18 is heated, to a second position in which the expansion member is cooled, the expansion and contraction of the expansion member 18 being employed to cause the food retaining means to be rotated from the first to the second position and vice versa.

We claim:

1. A barbecue apparatus comprising:
   food retaining means adapted to hold a piece of food;
   support means for supporting the food retaining means above a bed of coals; and food turning means including a screen and an expansion member, the screen being adapted, in a first position, to expose the expansion member to heat radiated from the bed of coals and, in a second position, to screen the expansion member from said heat, the expansion member comprising a closed bellows containing a fluid adapted to cause the bellows to expand when it is heated by said heat and to contract when it is cooled;
   the food turning means being adapted, upon expansion of the bellows, to turn the food retaining means from the first position in which one side of the food is exposed to heat transferred from the bed of coals, to the second position in which another side of the food is exposed to heat transferred thereto from the bed of coals and in which second position the bellows is allowed to cool by radiation of heat therefrom, the resultant contraction of the bellows causing the food retaining means to be turned from the second position back to the first position.

2. A barbecue apparatus as claimed in claim 1, in which the food retaining means is substantially rectangular, each corner thereof being provided with a flanged wheel, the wheels of each short side of the food retaining means being locatable on a track adapted to guide the food retaining means from the first position to the second position and from the second position back to the first position when an appropriate torque is applied thereto by the food turning means.

3. A barbecue apparatus as claimed in claim 2, in which each track comprises a three-membered ring of which each member is convexly curved along an arc of a circle having a radius slightly exceeding the distance between the outer surfaces of the wheels of each short side, the members being attached to one another in an end to end relationship.

4. A barbecue apparatus as claimed in claim 1, in which the food turning means also comprises energy storing means and a trigger mechanism, the energy storing means being adapted to store potential energy derived from respectively the expansion or contraction of the bellows, and to release the said potential energy upon actuation of the trigger mechanism, so as to turn the food retaining means from respectively the first position to the second position or from the second position to the first position.

5. A barbecue apparatus as claimed in claim 4, in which the trigger mechanism is operated by the bellows upon having stored sufficient energy in the energy storing means to turn the food turning means respectively from the first to the second position or from the second to the first position.

6. A barbecue apparatus as claimed in claim 1, in which the bellows comprises a spring, and the pressure inside the bellows is above atmospheric pressure when it is at ambient temperature.

7. A barbecue apparatus as claimed in claim 1, in which the bellows comprises a spring, and the pressure inside the bellows is below atmospheric pressure when it is at ambient temperature.

8. A barbecue apparatus as claimed in claim 1, in which expansion and contraction of the bellows is assisted by water inside the bellows respectively evaporating or condensing as the bellows is heated or cooled.

9. A barbecue apparatus as claimed in claim 1, comprising heat transfer acceleration means adapted to facilitate heat transfer from the bed of coals to the bellows during heating thereof by the bed of coals when the food retaining means is in the first position and from the bellows to the atmosphere when the food retaining means is in the second position.

* * * * *